United States Patent

Matsumoto et al.

[11] Patent Number: 5,755,150
[45] Date of Patent: May 26, 1998

[54] CLAMSHELL GRIDDLE

[75] Inventors: Yosihisa Matsumoto; Yoshiteru Takekawa, both of Tokyo; Hiroyuki Kamei, Fukushima-ken; Toshiya Matsumoto, Tokyo; Tetsuo Sasaki, Fukushima-ken, all of Japan

[73] Assignee: Tanico Corporation, Tokyo, Japan

[21] Appl. No.: 891,073

[22] Filed: Jul. 10, 1997

[30] Foreign Application Priority Data

May 13, 1997 [JP] Japan .................................. 9-122134

[51] Int. Cl.$^6$ .............................. A47J 37/00; A47J 37/06; A47J 37/10
[52] U.S. Cl. ........................ 99/334; 99/349; 99/372; 99/374; 99/379; 99/423; 99/448
[58] Field of Search ................. 99/339, 340, 326–336, 99/337, 338, 349–351, 372–380, 386, 422, 423, 443 R, 443 C, 448; 100/93 P, 125, 257, 266, 319, 320, 325, 326, 194, 265, 910; 219/388, 400–402, 408–414; 426/233, 523, 518, 644

[56] References Cited

U.S. PATENT DOCUMENTS

| | | | |
|---|---|---|---|
| 4,320,699 | 3/1982 | Binks | 99/349 |
| 4,502,374 | 3/1985 | Davis | 99/448 X |
| 4,586,428 | 5/1986 | Adamson | 99/332 |
| 4,878,424 | 11/1989 | Adamson | 99/340 X |
| 5,341,727 | 8/1994 | Dickson | 99/335 |
| 5,381,725 | 1/1995 | Breunig et al. | 100/194 X |
| 5,417,149 | 5/1995 | Raio et al. | 99/349 |
| 5,419,250 | 5/1995 | Ferguson | 100/125 X |
| 5,473,976 | 12/1995 | Hermansson | 99/379 X |
| 5,531,155 | 7/1996 | Pellican et al. | 99/372 X |
| 5,570,625 | 11/1996 | Liebermann | 99/330 |
| 5,588,354 | 12/1996 | Stuck et al. | 99/386 |
| 5,655,434 | 8/1997 | Liebermann | 99/330 |

*Primary Examiner*—Timothy F. Simone
*Attorney, Agent, or Firm*—Evenson, McKeown, Edwards & Lenahan, PLLC

[57] ABSTRACT

A clamshell griddle is designed so that the rising, lowering and rotating motions of the platen and the setting of distance between the griddle and the platen main body can be effected automatically and in one stroke by the operation of a single motor, thereby resulting in simple structure and low price.

5 Claims, 7 Drawing Sheets

CLAMSHELL GRIDDLE

BACKGROUND OF THE INVENTION

1. Field of the Invention

The present invention relates to a clamshell griddle for baking a pâté of hamburger etc. from both sides.

2. Description of the Prior Art

Recently, the fast-food restaurant such as hamburger shop has spread remarkably. In the hamburger shop, the so-called clamshell griddle is employed to bake various kinds of pâtés such as hamburger in short time efficiently. The conventional clamshell griddle comprises a griddle on which is placed a pâté to be heated up, a lower heating apparatus arranged under said griddle, and an upper heating apparatus arranged above said griddle, so that the pâté on the griddle can be baked from its lower side and its upper side at the same time.

In the conventional clamshell griddle, during heat-cooking a pâté, the upper heating apparatus is held above the griddle at a desired distance suitable for the heat cooking therefrom. On the other hand, when the operator set a pâté to be heat-cooked on the griddle or take it out therefrom after baked, the upper heating apparatus is moved to an open position to allow his easy access to the griddle so as not to hinder his operation.

This type of conventional clamshell griddle can bake a pâté in short time because of its baking from both sides. The conventional clamshell griddle, however, is made up of separate components of: a drive mechanism for moving an upper heating apparatus to a predetermined position; an adjusting means for adjusting a distance from said upper heating apparatus to a griddle to a desired value; and another drive mechanism for moving said upper heating apparatus to an open position. Therefore, the structure of the clamshell griddle becomes, as a whole, rather complicated and, consequently, expensive.

An object of the present invention is to provide a clamshell griddle which can solve a problem described above.

SUMMARY OF THE INVENTION

According to the present invention, there is provided a clamshell griddle for heat-cooking a material to be heat-cooked from both sides comprising:

a main body;

a griddle arranged in the upper portion of said main body for placing a material to be heated on it;

a lower heating means arranged under said griddle;

an upper heating means which can be moved between a heat cooking position having a spacing of desired distance from said griddle on its upper side and an open position having a certain distance from said griddle above; and a drive means for moving said upper heating means between said heat cooking position and said open position;

said driving means comprising:

a support means for supporting said upper heating means;

a moving means for moving said support means up and down;

a travel detecting means for detecting a travel amount of said support means;

a desired distance setting means for setting said desired distance; and a control means for moving said upper heating means to said heat-cooking position or to said open position in one stroke by controlling a motion of said moving means based on a travel amount detected by said travel detecting means and a desired distance set by said desired distance setting means.

According to a preferred embodiment of the present invention, said support means comprises: a bearing portion; a shaft support portion which is supported by said bearing portion rotatably; and an arm portion to one end of which is attached said upper heating means and to another end of which is attached a cum operation portion placing said shaft support portion between.

said moving means comprises: a feed screw shaft installed on said main body rotatably extending up and down direction; a motor for driving said feed screw shaft rotatively; a feed screw nut engaging with said feed screw shaft; a bearing portion support shaft which links said feed screw nut and said bearing portion together and moves as said feed screw nut moves; and a cum portion which is fixedly attached to said main body and rotates said arm portion centered on said shaft support portion to make an opening and closing motion of said upper heating means as said bearing portion moves up and down direction by operating said cum operation portion of said arm portion.

said travel detecting means is of a type which detects a number of revolutions of said motor, and said control means includes a motor drive control circuit which controls drive and stop motion of said motor based on the result of comparison between the desired distance value set by said desired distance setting means and the number of revolutions of the motor detected by said travel detecting means.

In accordance with an embodiment of the present invention, said motor is a motor equipped with a brake and said travel detecting means is a rotary encoder.

In accordance with another embodiment of the present invention, said lower heating means is a gas burner and said upper heating means is an electric heater.

In accordance with a special embodiment of the present invention, said griddle is made of chrome molybdenum steel.

This invention will now be described in further detail with regard to preferred embodiments as illustrated in the accompanying drawings.

DESCRIPTION OF THE PREFERRED EMBODIMENTS

Figure 1:
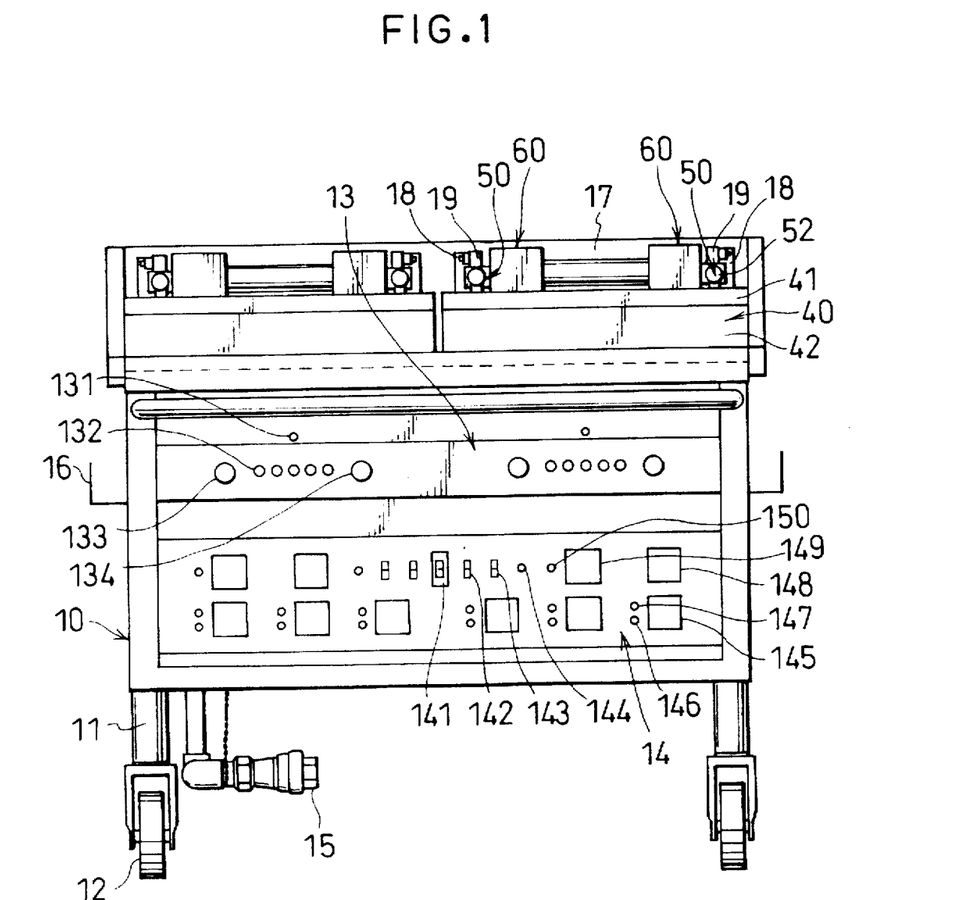
FIG. 1 is a schematic elevational view of a clamshell griddle as a preferred embodiment of the present invention.
Figure 2:
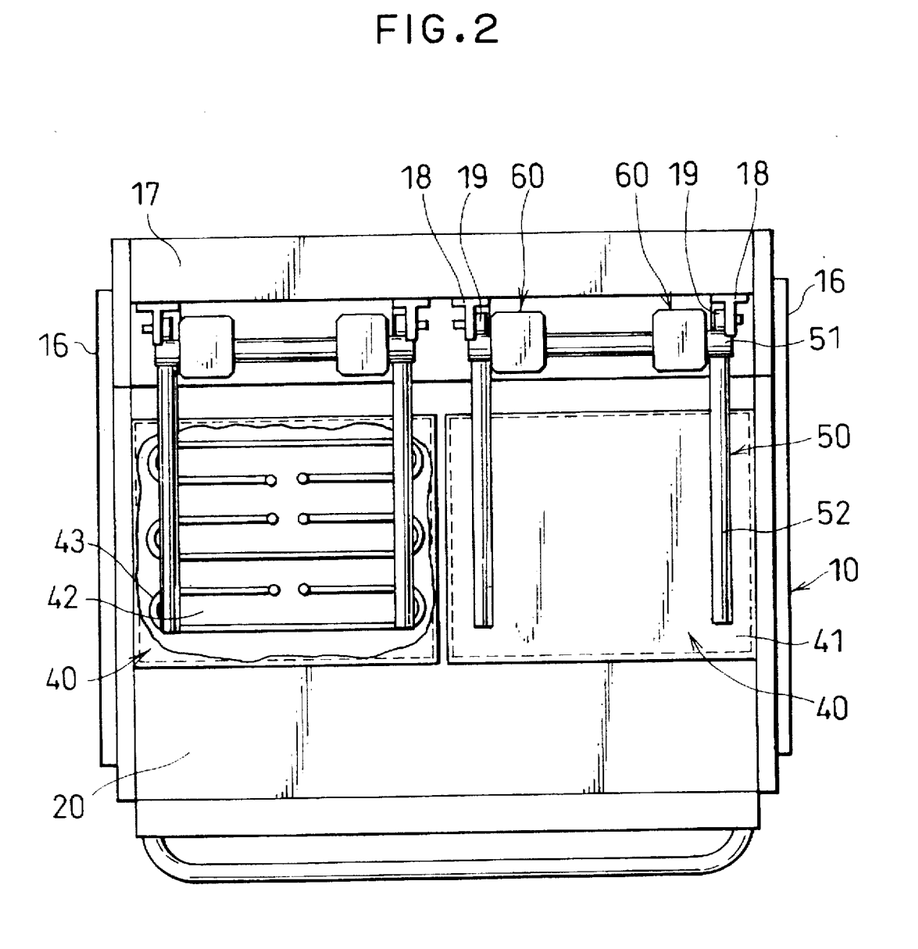
FIG. 2 is a partly sectional schematic plan view of the clamshell griddle of FIG. 1.
Figure 3:
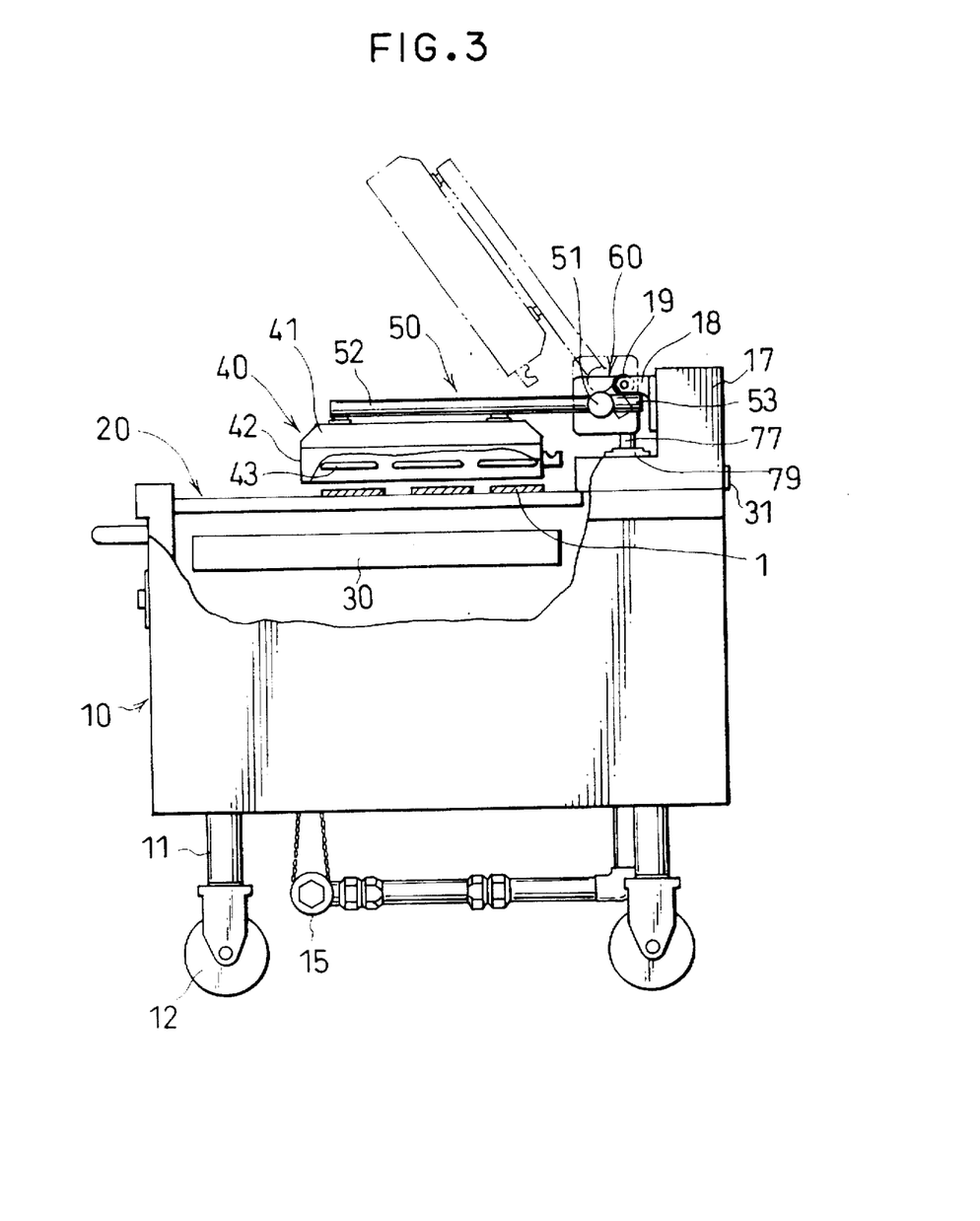
FIG. 3 is a partly sectional schematic side elevation view of the clamshell griddle of FIG. 1.

As shown in FIGS. 1, 2, and 3, the clamshell griddle of this embodiment has a housing portion 10 which forms main body, and said housing portion 10 is equipped with four leg members 11 having respective fixed casters 12, so that it can be installed stable on the floor of kitchen of the restaurant etc.

As shown apparently in the elevational view FIG. 1, on the front of the housing portion 10 are arranged an upper operation panel 13 and a lower operation panel 14. The upper operation panel 13 is equipped with a pair of stand-by lamps 131, a pair of position lamps 132, a pair of raise switches 133, and a pair of stand-by switches 134, arranged on the right and the left respectively. The lower operation panel 14 is equipped with a main switch 141, a lower grill electric source switch 142, a platen main body electric source switch 143, a position switch 144, a lower grill temperature regulator 145, an igniting lamp 146, a malfunctional warning lamp 147, a cooking timer 148, a platen main body temperature regulator 149 and a heater operation indicator lamp 150.

As shown in FIG. 3 apparently, in the upper portion of said housing portion 10 is arranged a griddle 20 horizontally. It is preferable that the griddle 20 is made of heat treated and polished material, and, in this embodiment, it is made of chrome molybdenum steel. The chrome molybdenum steel has a bactericidal activity, so that the sanitary condition can be maintained easily. Inside the housing portion 10, a lower grill gas burner 30 is arranged under the griddle 20 as a lower heating means.

Adding to that, in the clamshell griddle of this embodiment, a pair of platen main bodies 40 is arranged as an upper heating means on the right and the left above the griddle placing a predetermined distance therefrom. The platen main body 40 comprises an upper platen cover 41 and a platen 42 in which an electric heater 43 is embedded. In this embodiment, the platen 42 and the electric heater 43 are of an aluminum casting heater type.

In the lower portion of the housing portion 10 is arranged a coupler 15 to connect the lower grill gas burner 30 to a source of gas supply and is also arranged a receptacle (not shown) to connect each electric heater 43 of the platen main body 40 to an electric source. On both sides of the housing portion 10 are arranged respective grease can support fittings 16 to support grease cans.

Figure 4:
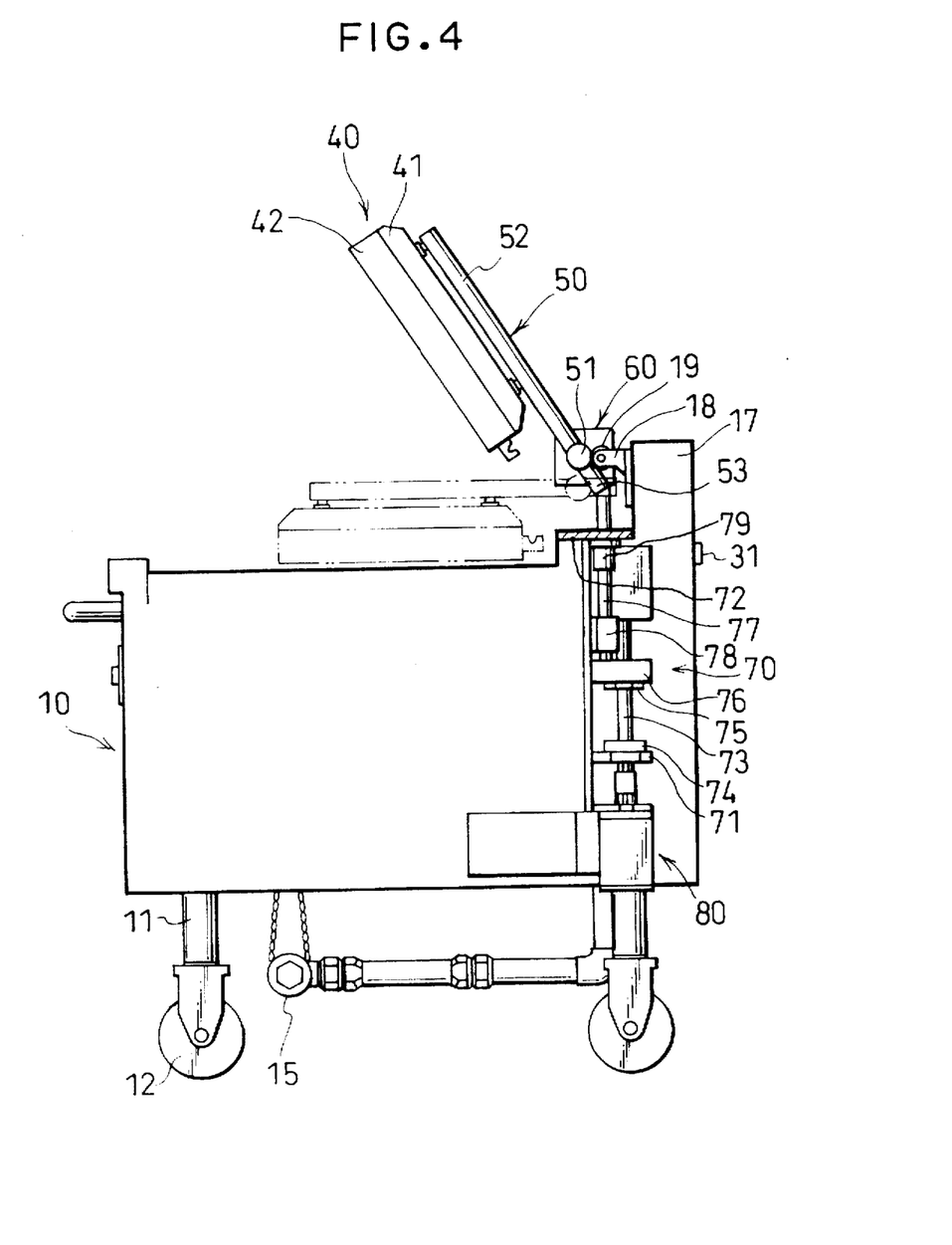
FIG. 4 is a partly sectional schematic side elevation view of the clamshell griddle of FIG. 1 illustrating another phase different from that of FIG. 3.

FIG. 4 is a partly sectional schematic side elevation view of the clamshell griddle of FIG. 1 illustrating another phase of its motion different from that of FIG. 3. As shown apparently in FIG. 4, on a back portion 17 of the housing portion 10 are arranged an arm portion 50 and a bearing portion 60 as a support means to support the platen main body 40, a feed screw assembly 70 and a motor with brake 80 to compose a moving means, a rotary encoder 90 as a travel detecting means. To add to that, on the upper portion of the back portion 17 of the housing portion 10 is arranged a pair of cum roller supports 18 to which a pair of cum rollers 19 is attached rotatably on the corresponding positions to a pair of arm portions 50.

The arm portion 50 comprises a shaft support portion 51 supported by a bearing portion 60 rotatably, a support portion 52 for hanging and supporting the platen main body 40 and a cum operation portion 53 attached to one end and another end of said arm portion respectively placing said shaft support portion 51 between. The arm portion 50 is designed to rotate from a closed position where the arm is held parallel with the griddle 20 as shown in FIG. 3 by solid line to an open position as shown in FIG. 4 by solid line around the shaft support portion 51 supported by the bearing portion 60. As for the relation between the bearing portion 60 and the arm portion 50, they are designed so as not to be rotated anti-clockwise to the lower direction beyond the closed position shown in FIG. 3 by solid line and, after having reached to said closed position, they moves vertically keeping parallel with the griddle. The rotating motion of the arm portion 50 from the open position shown in FIG. 4 to the closed position shown in FIG. 3 is designed so as to be executed by the self-weight of the platen main body 40.

The feed screw assembly 70 composing a part of the moving means comprises a feed screw shaft 73 installed extending vertically through a feed screw nut support 76 and a lower frame 71 arranged on the lower portion of the back portion 17 of the housing portion 10. The feed screw shaft 73 is designed so as to penetrate rotatably a feed screw support 74 attached to the lower frame 71. The feed screw shaft 73 is designed so as to be rotatively driven by a motor with brake 80 attached to the lower frame 71. Furthermore, the feed screw assembly 70 comprises a feed screw nut 75 engaging with the feed screw shaft 73, and said feed screw nut 75 is supported by the feed screw nut support 76. The feed screw nut support 76 moves, as described later, together with the feed screw nut 75 as it moves along the feed screw shaft 73. On both sides of the feed screw nut support 76 are installed respectively bearing portion support shafts 77 perpendicularly upward. Each bearing portion support shaft 77 is designed so as to be moved vertically through a direct acting bearing A78 and another direct acting bearing B79 as the feed screw nut support 76 moves.

To the upper end of each bearing portion support shaft 77 is connected a corresponding bearing portion 60 respectively. Therefore, the bearing portion 60 is moved up and down as the bearing portion support shaft 77 moves up and down. To the lower frame 71 is attached a rotary encoder 90 composing the travel detecting means and said rotary encoder 90 is rotated by the revolution of the motor with brake 80 through a synchro-belt 81 and generates an electric pulse in proportion to its rotation (see FIGS. 4 and 5).

Figure 5:
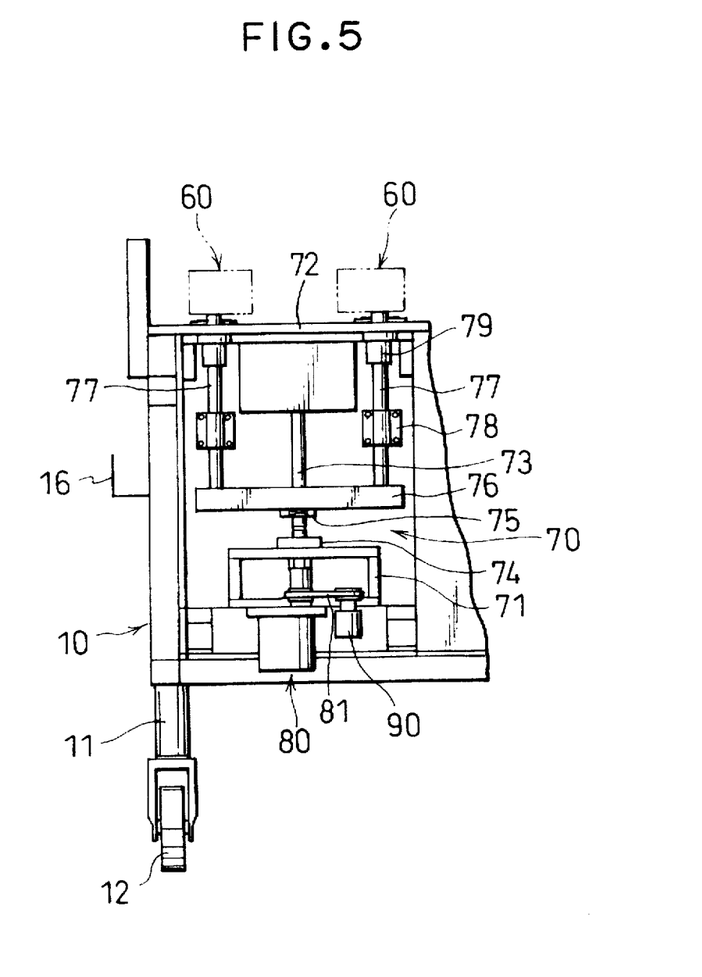
FIG. 5 is a rear elevational views of the clamshell griddle of FIG. 1 with a back plate removed.
Figure 6:
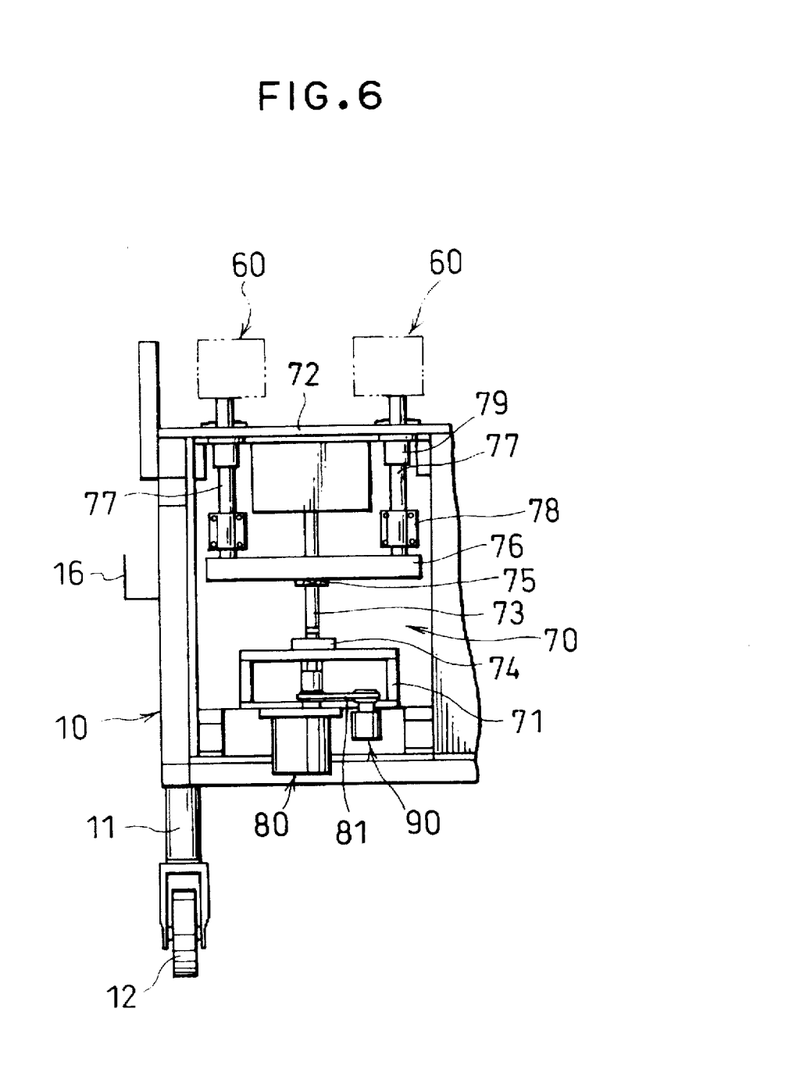
FIG. 6 is a rear elevational views of the clamshell griddle of FIG. 1 with a back plate removed illustrating a different condition from that of FIG. 5.
Figure 7:
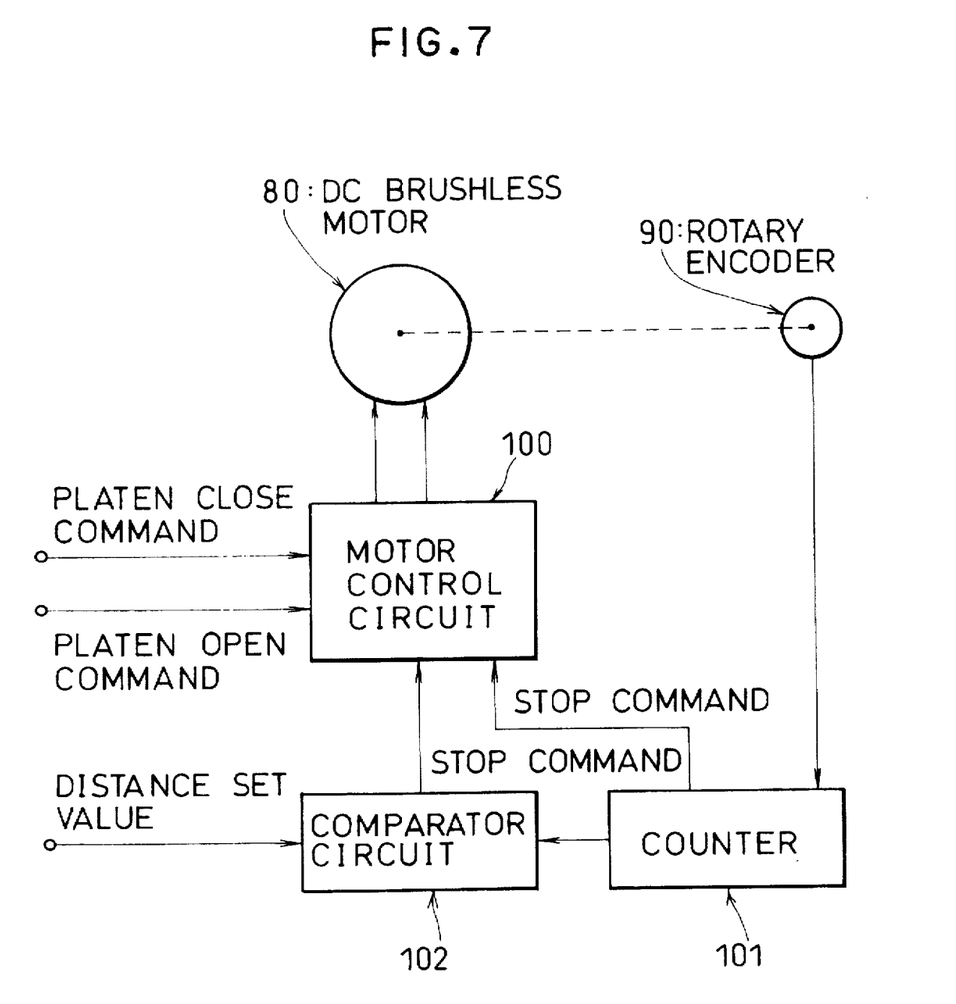
FIG. 7 is a block diagram illustrating an example of an electronic control portion arranged on the housing portion of the clamshell griddle of FIG. 1.

Then, the motion of the clamshell griddle having above mentioned structure will be described with reference to FIGS. 5, 6 and 7. FIGS. 5 and 6 are rear elevational views, in which a back plate is removed for easier understanding, illustrating a connecting relation of components arranged on the back portion 17 of the housing portion 10, the feed screw assembly 70, the motor with brake 80 and the rotary encoder 90, and FIG. 5 shows the condition where the bearing portion 60 is in its lower position and FIG. 6 shows in its upper position. FIG. 7 is a block diagram illustrating an example of an electronic control portion arranged on the housing portion 10.

The electronic control portion shown in FIG. 7 comprises, as main components, a motor control circuit 100 for controlling a motion of the motor with brake 80, a counter 101 for receiving the electric pulse from the rotary encoder 90 and computing, and a comparator circuit 102. The electronic control portion also comprises a desired distance setting circuit (not shown) for setting a distance between the griddle 20 and the platen main body 40 during heat cooking to a desired value. An operator can input a distance set value which represents the desired distance between the griddle 20 and the platen main body 40 into the comparator circuit 102 through the desired distance setting circuit by operating the position switch 144 arranged on the lower operation panel 14 of the housing portion 10.

The operator who executes a heat cooking of a pâté for hamburger, when the platen main body 40 is on the griddle 20, in the closed position as shown in FIG. 3 by solid line, at first, actuates the raise switch 133 of the upper operation panel 13. Then, as shown in FIG. 7, a command for opening the platen is inputted into the motor control circuit 100. The motor control circuit 100, in response to it, actuates the motor with brake 80 to revolve in the designated direction. As the motor with brake 80 revolves, the feed screw shaft 73 is rotated in the designated direction. At that time, the feed screw nut 75 engaging with the feed screw shaft 73 is relatively moved to the designated direction, in this case, to the upper direction. Consequently, the feed screw nut support 76 and the bearing portion support shaft 77 are moved upward from the lower position shown in FIG. 5.

As the bearing portion support shaft 77 is moved upward, the bearing portion 60 is moved upward, so that the arm portion 50 supported by the bearing portion 60 is also moved upward holding the platen main body 40 and keeping it parallel with the griddle. While being moved upward, the cum operation portion 53 of the arm portion 50 begins to contact with the corresponding cum roller 19 arranged on the back portion 17 of the housing portion 10. Then, because the position of the cum roller 19 is fixed, a pressing force is applied to the cum operation portion 53 of the arm portion 50 downward (clockwise), so that the arm portion 50 is rotated clockwise around the shaft support portion 51 supported by a bearing portion 60.

At that time, the number of electric pulses proportional to the number of revolutions of the motor with brake 80 is added to the counter 101 by the rotary encoder 90. For example, an upper limit of the count value which corresponds to the travel of the bearing portion 60 where the platen main body 40 reaches up to its open position shown in FIG. 4 is set in the counter 101. The counter 101 counts incrementally the electric pulses from the rotary encoder 90. When the counter 101 reaches the upper limit of the count value set previously, the command for stopping the motor is issued to the motor control circuit 100 to stop the driving motion of the motor 80. As a result, the platen main body 40 is automatically stopped and hold in the desired open position shown in FIG. 4.

Then, the operator operates the position switch 144 on the lower operation panel 14 to input the distance set value suitable for the materials to be heat cooked. The inputted distance set value can be distinguished by which lamp among the position lamps 132 being lighted up on the upper operation panel 13. Furthermore, the operator turns on the lower grill electric source switch 142 and the platen main body electric source switch 143 on the lower operation panel 14, and sets the cooking time suitable for the materials to be cooked by the cooking timer 148, and also turns on the standby switch 134 on the upper operation panel 13.

When the gas burner 30 as a lower heating means is set on fire and the griddle 20 is heated up to the proper temperature for heat cooking, the standby lamp 131 on the upper operation panel 13 is lighted on. After the operator confirms the lighting of the standby lamp 131, he sets materials to be heat cooked, for example, the pâté 1 for hamburger (see FIG. 3), on the griddle 20. When the operator pushes the standby switch 134 and the raise switch 133 at the same time using both hands for his safety, a command for closing the platen is issued to the motor control circuit 100 and the motor control circuit 100, in response to the command, rotatively drives the motor with brake 80 in the reverse direction of that mentioned above. Consequently, the feed screw shaft 73 is rotated in the reverse direction of that mentioned above and the feed screw nut 75 engaging with said feed screw shaft 73 begins to be moved downward along the feed screw shaft 73 relative to it. As a result, the bearing portion support shafts 77 is moved downward from the upper position shown in FIG. 6. As the bearing portion support shafts 77 is moved downward, the bearing portion 60 is also moved downward, and the arm portion 50 supported by said bearing portion 60 begins to be rotated, with the platen main body 40 held by it, anti-clockwise around the shaft support portion 51.

The anti-clockwise rotation of the arm portion 50 is executed by the self-weight of the platen main body 40 and is designed to be stopped at the position where the platen main body 40 is parallel to the griddle 20. When the bearing portion support shafts 77 is moved down further after the platen main body 40 becomes parallel to the griddle 20, the platen main body 40 is simply moved down in the direction to reduce the distance to the griddle 20 keeping the parallel condition.

While the bearing portion support shafts 77 is moved down, the number of electric pulses proportional to the number of revolutions of the motor with brake 80 is added to the counter 101 by the rotary encoder 90. The counter 101 counts decrementally the electric pulses from the rotary encoder 90. That is, the counter 101 decrease the number of electric pulses generated by the rotary encoder 90 from the above mentioned upper limit of the count value set previously. The counter 101 outputs the current count value to the comparator circuit 102. The comparator circuit 102 compares this count value with the distance set value set by the operator as mentioned above and, when both values becomes equal, a motor stop command is issued to the motor control circuit 100 to stop the driving of motor 80. Therefore, the platen main body 40 is automatically stopped and held at the desired closed position shown in FIG. 3. The distance between the platen main body 40 and the griddle 20 at that time is equal to the desired value set by the operator.

Under this condition, the pâté 1 set on the griddle 20 is heat-cooked from both sides. Namely, the lower side of the pâté 1 is heat-cooked by the gas burner 30 and the upper side of the pâté 1 is heat-cooked by the electric heater 43 embedded in the platen main body 40. When the cooking time set by the operator using the cook timer 148 has passed, the platen can be automatically raised and rotated to be moved to the open position, and the operator is notified of this motion by a buzzer sound and the like. When the operator is notified that the cooking is finished, he can easily take out the cooked pâté 1 from the griddle 20.

The distance between the griddle 20 and the platen main body 40 can be precisely and automatically set to the arbitrary value, for example, between 5 mm and 20 mm by selecting the appropriate relation between a screw pitch of the feed screw shaft 73 and the number of electric pulses generated by the rotary encoder 90.

While the invention has been particularly shown and described with reference to the preferred embodiment in which the case for heat-cooking of pâté for hamburger is described, it will be understood by those skilled in the art that it can be applied also to the case for heat-cooking arbitrary food materials from both sides simultaneously. To add to that, the present invention allows an electric heater to be used as a lower heating means as well as an upper heating means though the above mentioned embodiment employs a gas burner as a lower heating means and, furthermore, the present invention allows one or more than three platen main bodies 40 to be used though the above mentioned embodiment employs two platen main bodies without departing from the spirit and scope of the invention.

According to the clamshell griddle structure of the present invention, the rising, lowering and rotating motions of the platen as an upper heating means and the setting of distance between the griddle and the platen main body can be executed automatically and in one stroke by the operation of a single motor. Therefore, the clamshell griddle can be made up with simple structure and at small expense.

Because the distance between the griddle and the platen main body during heat-cooking can be set arbitrarily and automatically, the optimal heat-cooking can be executed in accordance with the various food materials to be heat-cooked.

What is claimed is:

1. A clamshell griddle for heat-cooking a material to be heat-cooked from both sides comprising:

a main body;

a griddle arranged in the upper portion of said main body for placing a material to be heated on it;

a lower heating means arranged under said griddle;

an upper heating means which can be moved between a heat cooking position having a spacing of desired distance from said griddle on its upper side and an open position having a certain distance from said griddle above; and a drive means for moving said upper heating means between said heat-cooking position and said open position;

said driving means comprising:

a support means for supporting said upper heating means;

a moving means for moving said support means up and down;

a travel detecting means for detecting a travel amount of said support means;

a desired distance setting means for setting said desired distance; and a control means for moving said upper heating means to said heat-cooking position or to said open position in one stroke by controlling a motion of said moving means based on a travel amount detected by said travel detecting means and a desired distance set by said desired distance setting means.

2. A clamshell griddle as defined in claim 1, wherein said support means comprises: a bearing portion; a shaft support portion which is supported by said bearing portion rotatably; and an arm portion to one end of which is attached said upper heating means and to another end of which is attached a cum operation portion placing said shaft support portion between, said moving means comprising: a feed screw shaft installed on said main body rotatably extending up and down direction; a motor for driving said feed screw shaft rotatively; a feed screw nut engaging with said feed screw shaft; a bearing portion support shaft which links said feed screw nut and said bearing portion together and moves as said feed screw nut moves; and a cum portion which is fixedly attached to said main body and rotates said arm portion centered on said shaft support portion to make an opening and closing motion of said upper heating means as said bearing portion moves up and down direction by operating said cum operation portion of said arm portion, said travel detecting means being of a type which detects a number of revolutions of said motor, and said control means including a motor drive control circuit which controls drive and stop motion of said motor based on the result of comparison between the desired distance value set by said desired distance setting means and the number of revolutions of the motor detected by said travel detecting means.

3. A clamshell griddle as defined in claim 2, wherein said motor is a motor equipped with a brake and said travel detecting means is a rotary encoder.

4. A clamshell griddle as defined in claim 1, wherein said lower heating means is a gas burner and said upper heating means is an electric heater.

5. A clamshell griddle as defined in claim 1, wherein said griddle is made of chrome molybdenum steel.

* * * * *